United States Patent [19]

Jovic et al.

[11] 4,071,699

[45] Jan. 31, 1978

[54] APPARATUS PROVIDING FOR THE REMOTE DISPLAY OF CALLING NUMBERS IN A TELEPHONE SYSTEM

[75] Inventors: Nicola Ljotic Jovic, Chicago; Steven Allen Rinker, Rosemont, both of Ill.

[73] Assignee: International Telephone and Telegraph Corporation, New York, N.Y.

[21] Appl. No.: 653,711

[22] Filed: Jan. 30, 1976

[51] Int. Cl.² .......................................... H04M 15/06
[52] U.S. Cl. ............................... 179/5.5; 179/18 FH
[58] Field of Search .............. 179/5.5, 18 FH, 27 DB, 179/84 VF, 84 L, 90 AN

[56] References Cited

U.S. PATENT DOCUMENTS

| | | | |
|---|---|---|---|
| 3,686,440 | 8/1972 | Kroeger | 179/5.5 |
| 3,727,003 | 4/1973 | Paraskevakos | 179/5.5 |
| 3,787,626 | 1/1974 | Subieta | 179/5.5 |
| 3,864,522 | 2/1975 | Dekozan | 179/5.5 |
| 3,904,830 | 9/1975 | Every | 179/5.5 |

Primary Examiner—Kathleen H. Claffy
Assistant Examiner—Joseph A. Popek
Attorney, Agent, or Firm—James B. Raden; Marvin M. Chaban

[57] ABSTRACT

A control and apparatus are provided for visually displaying the identifying number of a calling line at a remote display associated with a called station of a telephone system. In processing a call to a line equipped with a calling line display, call completion is automatically delayed for a predetermined time period until the calling line is identified and stored. For a multiple line key telephone, a display may be provided for each line to which the station has access.

11 Claims, 15 Drawing Figures

LINE INTERFACE (LI) AND/OR
ATT. TRK. INTERFACE (ATI) CKT.

| A | Gx |
|---|----|
| 1 | 74 |
| 2 | 84 |
| 3 | 85 |
| 4 | 64 |
| 5 | 65 |
| 6 | 66 |
| 7 | 67 |
| 8 | 68 |
| 9 | 69 |
| 10 | 70 |
| 11 | 71 |
| 12 | 72 |
| 13 | 73 |

APPARATUS PROVIDING FOR THE REMOTE DISPLAY OF CALLING NUMBERS IN A TELEPHONE SYSTEM

BACKGROUND OF THE INVENTION

Numerical displays of calling and called numbers are, of course, well-known for use at operator's positions. For example, the Bell System Technical Journal, Vol. 49, No. 10, December, 1970 describes the Bell TSPS #1 with its multiple cathode tube displays of calling and called numbers. To provide the operator with this feature, a stored program controller is employed with its software and peripheral circuits. The large amount of apparatus required to perform this function is clearly not compatible with requirements for use with individual stations of a system.

SUMMARY OF THE INVENTION

The present invention is directed to control apparatus for a visual display which can be associated with any one of the remote stations of a telephone system, and preferably with a PBX or PABX. Such apparatus would be helpful for example in a hotel or a motel communications system for identifying the room or station calling for any requested service. At the bell captain's desk, room service center, travel desk or other service center, a display such as that of the present invention could be used to readily identify the calling station desiring the service and in this way, a clear indication would be given of the station to be charged for that service. By providing a display apparatus economical enough to be used at a plurality of locations in a system, the personnel at these stations would have a positive indication of the station ordering the service.

To provide the present function, the normal switching-through of the call should be delayed until the calling line is identified and the calling line data stored. Thus, once a call has been identified as a call directed to a called line provided with a display, call signalling and final processing of the call are delayed. During the delay period, the calling line is identified and its identification number is stored. The delay is implemented by simulating a call to a special feature circuit which normally requires a time delay in completion of call processing. During the delay period, the elevated voltage normally occurring during a line scan period is retained to enable easier identification of the calling line than would be possible with the lower voltage value characterizing a completed call.

Another desired feature of the invention is to provide a display for each line of a key telephone with a maximum of ten line displays per display control apparatus as disclosed herein.

Therefore, it is an object of the invention to provide an improved apparatus and control for the visual display of a calling line.

It is a further object of the invention to provide a control apparatus in which identification of a called line equipped with a display causes a delay in the call completion to enable the identification of the calling line.

It is a still further object of the invention to provide a control apparatus in which, once an operation of the line display unit is called for, line scan voltage is maintained on the calling line to ease the problem of identifying that calling line.

It is still another object of the invention to provide a control apparatus which provides calling line identification on a time shared basis for a plurality of separate lines.

Other features, objects and advantages of the invention will become apparent from the following detailed description viewed in conjunction with the drawings described in the following lines.

DETAILED DESCRIPTION

Figure 1:
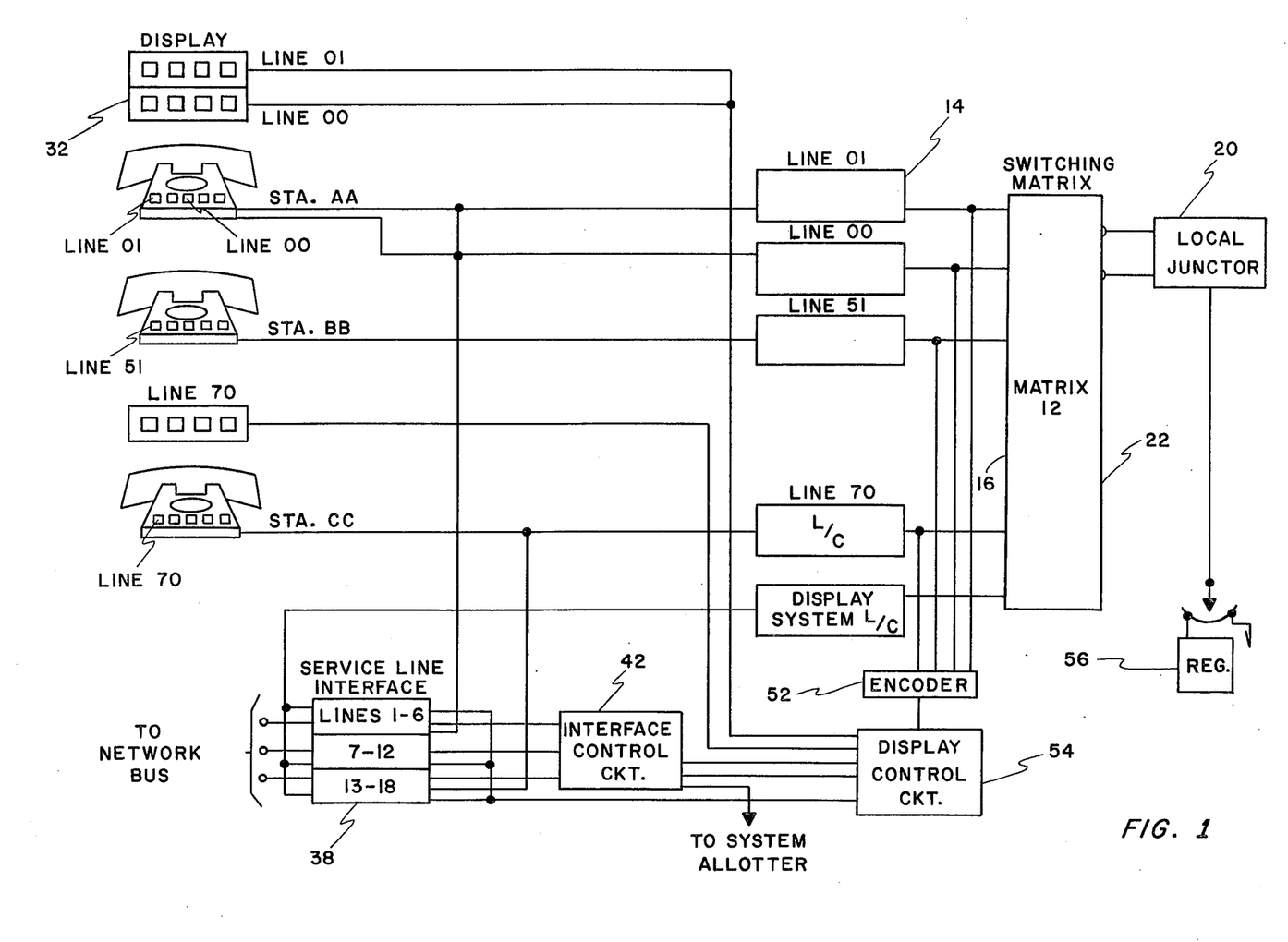
FIG. 1 is a circuit block diagram of a calling number display system employing our invention.

In FIG. 1 we show our display control apparatus applied to a telephone switching system of the type shown generally in U.S. Pat. No. 3,204,044 to V. E. Porter. In a system such as that shown, there is provided a switching matrix 12 for completing calls from a calling station, such as AA, through a line circuit 14 on the line side 16 of the matrix 12 to a supervisory circuit, such as a local junctor 20, on the supervisory side 22 of the matrix with a final path through the matrix from the supervisory circuit to a called station, such as station BB or CC. Stations AA, BB and CC are shown supplied with lamp keys or buttons for providing key telephone service, station AA is shown with display units for each of two lines accessible thereat, station CC is shown with a single line display on line 70 and station BB is shown with no display capability.

Associated with the station AA is a digital display unit 32 using a multi-digit display such as tubes sold under the trademark NIXIE or the like. A four-digit readout is provided for each of two lines 00 and 01 to which the station AA has access.

On the station side of the display, each line circuit for a line having a station display unit is provided with a connection to a service line interface 38, each interface having connection to the control bus for the system. Each service interface 38 has as many as five sections, each section serving a line havig display capability, the interface units commonly being connected to an interface control circuit 42. The service interface 38 acts to delay the termination to the display equipped line to provide a time interval for identification of the calling line.

Each of the line circuits L/C, in the telephone system (both normal line and display apparatus), has a connection both to the matrix and to an encoder 52 which forms part of the present apparatus. The encoder identifies a calling station and encodes the calling station number for feeding this number information in coded form to a display control circuit 54 for storage in memory locations, each location being dedicated to a particular display equipped line. The display control circuit 54 has a connection to each of the actual display console units 32 to provide, on demand, time multiplexed signals to the display console units.

Also shown in FIG. 1 on the supervisory side (22) of the network is a local junctor 20 for completing and supervising local calls. A junctor to perform this function, as is well known in the art, has two appearances on the supervisory side of the matrix and is also connected to a register 56, the register 56 feeding information, in turn, to the display interface circuit.

On a normal call from a station, the calling station lifts the station hand set. If the station is a key station, a key button for an idle line is depressed. These actions provide an indication on the line circuit dedicated to that line that the line is seeking service. The presence of a line seeking service causes a local junctor such as 20 to be allotted to handle the call and a register 56 is allotted to the local junctor. A path through the matrix is completed from the calling line appearance to the local junctor appearance, the junctor bringing the register into operation. In the case of a PABX, a local calling party dials up to four digits for a local call, representing the called line when a local line is in fact called. The local junctor causes a busy test to be made to the called line. If the called line is available, a path is completed through the matrix from the local junctor appearance to the line side appearance of the called line. Ringing occurs and the call is completed.

Figure 2:
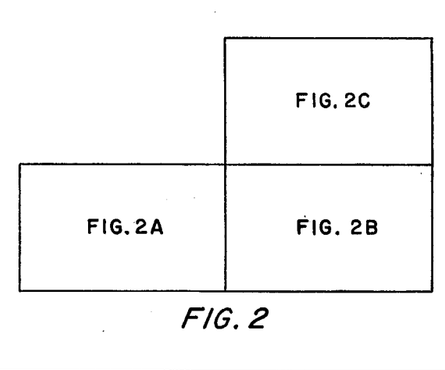
FIGS. 2, 2A, 2B and 2C are schematic circuit diagrams of the service station interface of FIG. 1.
Figure 2A:
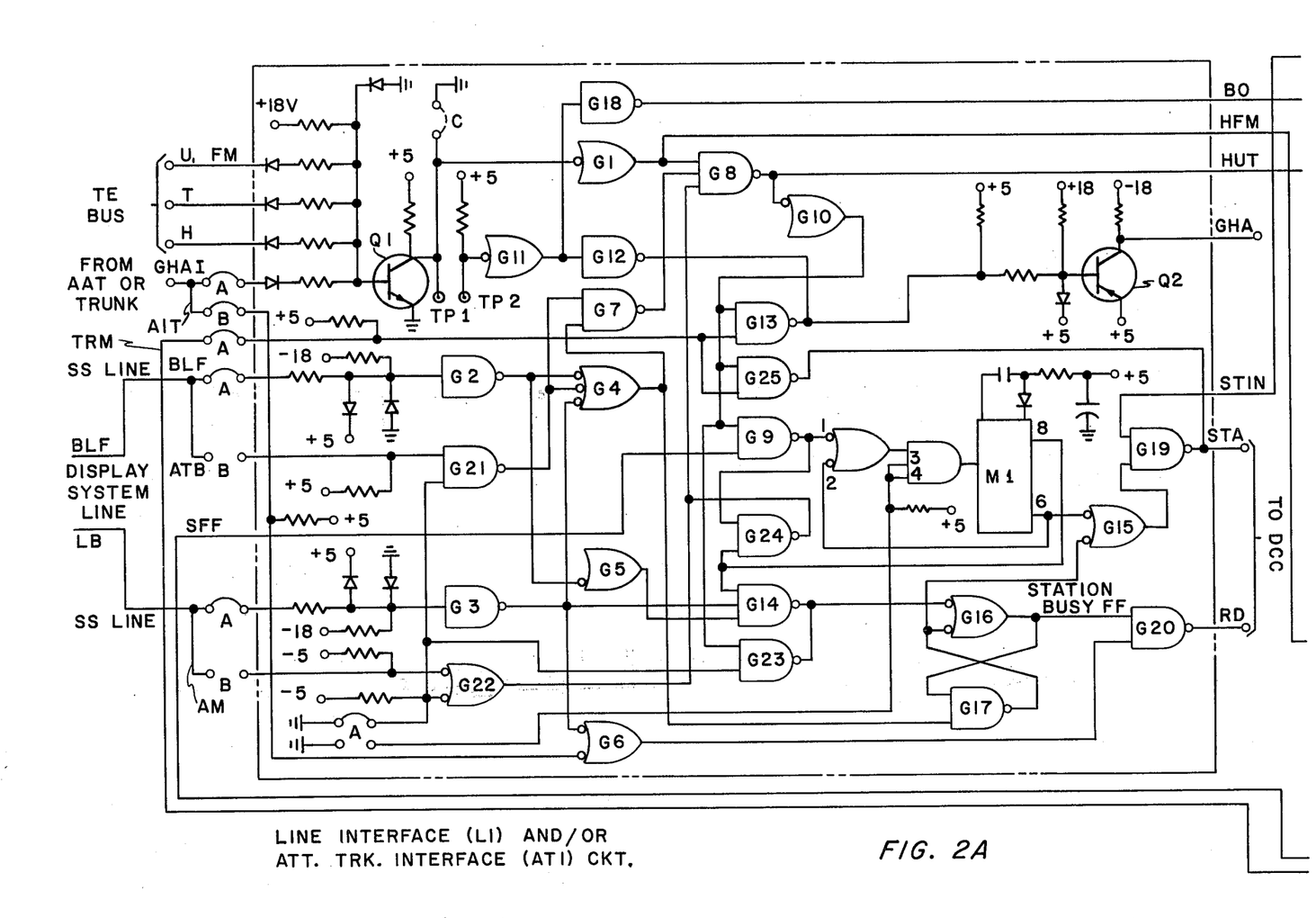
Figure 2B:
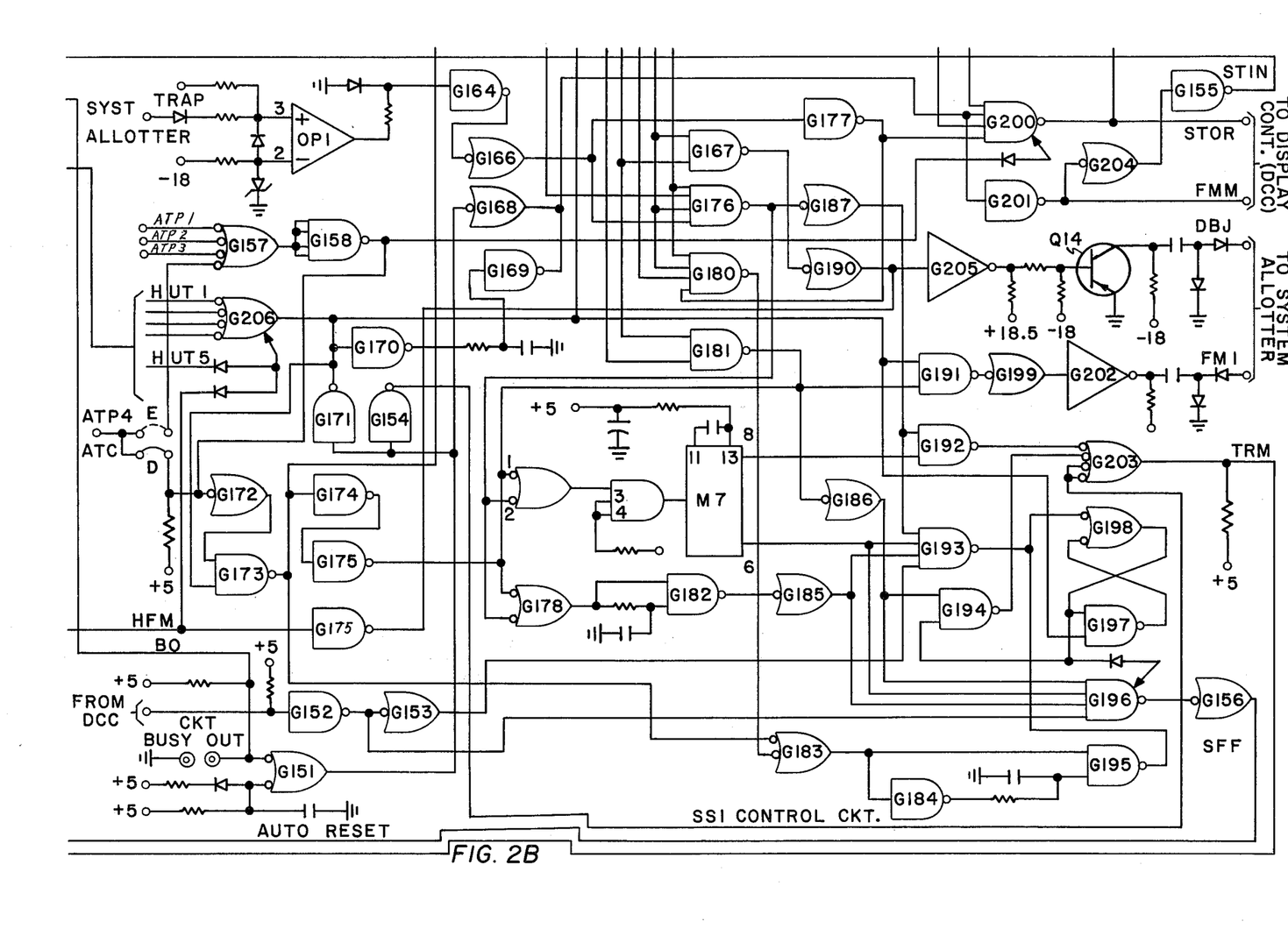
Figure 2C:
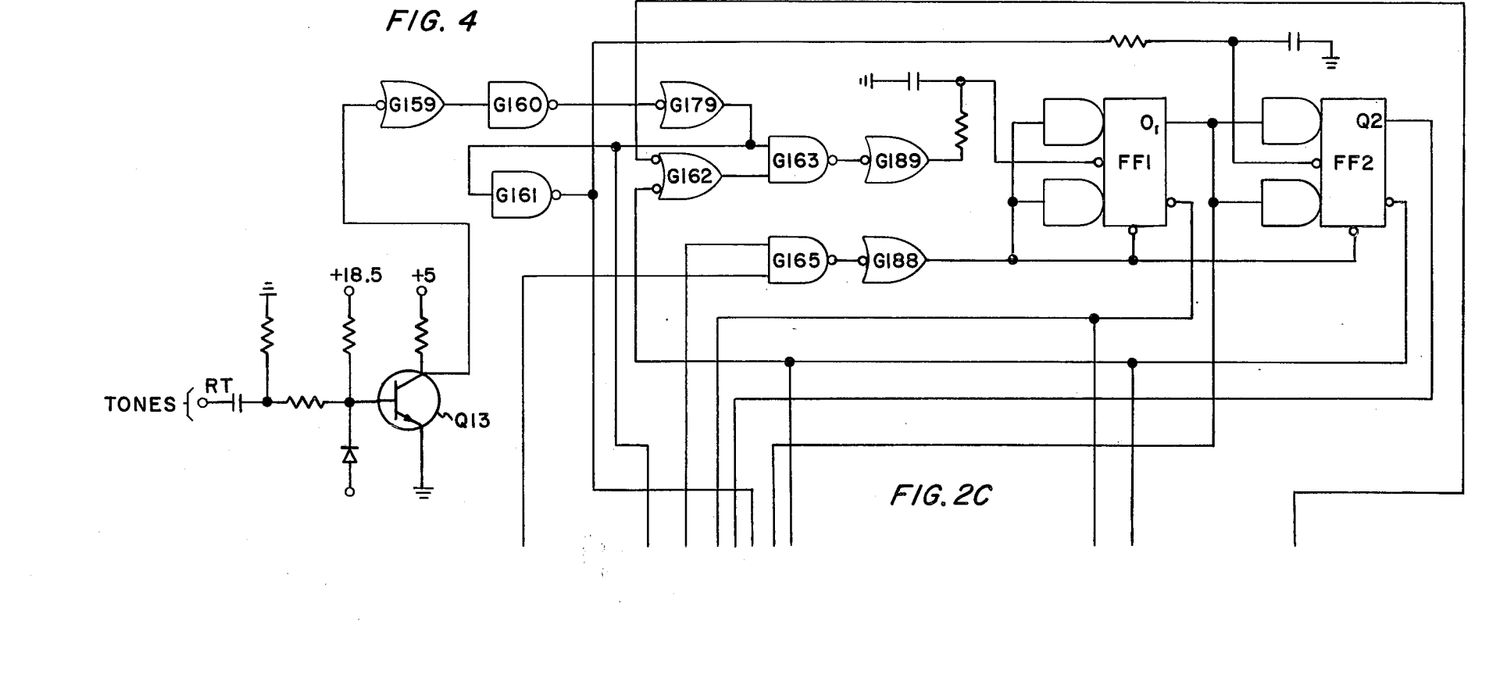

When a terminating signal is extended via the telephone system bus to a line equipped with a display unit, the call is intercepted by the interface circuit 38, shown in detail in FIGS. 2A, 2B and 2C. In response to the interception, the interface control circuit 42 generates an FMI signal which is sent to the system allotter. An allotter of the type used herein is shown in U.S. Pat. No. 3,621,144 issued Nov. 16, 1971 to N. Jovic et al. The allotter, as set out in the cited patent, in turn, starts a "drop junctor" sequence. This sequence provides a time delay or extension of the duration of one matrix path selection cycle to allow time for the function of identification of the calling line to occur.

As a result, the calling line is dropped from its connection to the local junctor by release of the matrix in response to Drop Junctor and Trap signals. In compliance with the release, the line appearance of the calling line switches to +18.5V, the line scan voltage. This +18.5 volt signal is passed to the line encoder circuit 52. The presence of this signal on leads representing the calling line is detected and the line number represented by the leads bearing the signal is encoded to correspond to the calling line's directory number. The encoded signal is then stored in a temporary store in the display control circuit 54 during the time an active signal exists on the STOR lead, which in turn, is derived from the time difference of active signals on the Drop junctor and TRAP leads.

During the continuation of the TRAP mark period, the line circuit of the calling line is tested for busy/idle status. This test is made because the display line may only appear to be idle although it actually could be busy. Such a condition might occur during rotary dialing or hookswitching. At the end of the TRAP signal period, the calling line is released from the TRAP by the system allotter. The interface circuit generates a signal of its own which is then superimposed on the DBJ lead. In compliance with this DBJ lead signal, the calling line refires a connection through the matrix to the local junctor from which it had been dropped at the beginning of the Drop Junctor (DJ) sequence.

The DBJ signal which is internally derived in the interface circuit acts to remove the FMI signal to the system allotter, and for the duration of the unexpired portion of the terminating pulse (from the telephone system bus), termination to the display line (53 line) is allowed.

The interface circuit 38 monitors the matrix firing and if the firing is successful, a flip-flop signal is set which is then in control of display for the duration of the call via an active signal on the appropriate STA lead. In order to transfer the data from the temporary store into a more permanent station-assigned store, all other active STA leads, at this time, are inhibited via STIN leads.

When the call is answered, the interface circuit sends a signal over the RD lead. The identity of the calling line is displayed at the called station display console on the time sharing basis because other lines also may be in the read mode.

When the called line hangs up, the assigned stores in the display control 54 are cleared.

A typical interface circuit is shown in detail in FIG. 2. One such interface circuit of the type shown in FIG. 2A is provided for each line, with the control circuit of FIG. 2B being usable for up to eighteen interface circuits such as that of FIG. 2A.

In the idle condition of FIGS. 2A and 2B, transistors Q1–Q12 and Q14 are off and transistor Q13 is essentially off. An incoming call coming from an attendant or from a trunk circuit will be indicated by the presence of a signal on the appropriate GHAI lead; all other incoming calls will be signalled from the telephone system bus over leads U, T and H designating units, tens and hundreds digits of the calling station.

Either signal is transmitted through transistor Q1 and gate G1 to gate G8. If the SS or display system line is idle (both leads BLF1 and LB1 are at ground) and not in the interim period (corresponding to matrix seizure prior to operation of the RU relay, the condition being indicated by an active state of the ring up of time M3), gate G8 emits a "0" signal.

The "0" signal placed by gate G8, primes the terminating gate G13 and timer M1 via gate G9. In addition, the "0" activates the control circuit of FIG. 2B via lead HUT1 to gate G206. As a result, the prior inhibit on flip-flops FF1 and FF2 (FIG. 2C) is removed via gates G165, G188. The prior inhibit on terminating flip-flop FF (FIG. 2B) comprised of gates G197/G198 is also removed.

In addition, the STOR lead to display control circuit 54 is pulsed to a "0" condition via gates G170, G169, G200. The FMM lead to the display control is pulsed also to "0" via gate G201; a negative pulse is extended to the system allotter, via the FM1 lead, from gates G202, G199 and G191. The system allotter starts its drop junctor (DJ) sequence.

The "0" on the STOR lead is used to pulse the input of flip-flop FF1 to +5V via gates G162, G163 and "1" extended to gate G163 by the circuit clock, which is derived from 620 Hz (RT lead) via transistor Q13 and gates G159, G160, and G179. At the same time the TRAP lead is monitored.

When the calling line is trapped. i.e., released from the original call path but held in a busy state, operational amplifier OP1 produces a +5V on its output lead. As a result, the signal on the STOR lead switches to a "1". The inlet to flip-flop FF1 experiences a negative change via gates G162, G163, G189, causing FF1 to set such that its output leads 01 and 02 produce a "0" and "1" respectively. As a result, a "10" state is decoded from flip-flops FF1 and FF2. This, together with the true conditions of the clock and TRAP via G179 and G164, respectively, causes gate G176 to put out a "0" which in turn, starts a 150 microsecond timer, M7.

In addition, a "0" from G176 causes momentary termination of the service line, via G187, G192, G203, TRM lead, G13, Q2 and GHA1 lead.

Should the TRAP circuit fail, flip-flop FF1 will experience the needed negative change after clock (G179) switches to its false state, i.e., "0". Under this condition, termination to the line is maintained unconditionally, i.e., without a positive indication of the state of the display system line. The unconditional termination is accomplished by setting the terminating flip-flop gates G197/G198 via G180, and a pulse generator including gates G183, G184 and G195.

When the clock becomes true again, gate G179 produces a "1", so the inlet to flip-flop FF2 is pulsed to ground via G161. FF2 changes state such, that a "1" is placed on pin 9 and "0" on pin 8 of flip-flop FF2.

An "11" state is decoded from flip-flops FF1 and FF2 via gate G167. As a result, a signal is generated on lead DBJ via G190, G205 and Q14. This signal allows the calling line to refire into the local junctor. When the clock switches to its false state, i.e., G179 produces a "0" and since pin 8 of FF2 is at a "0", flip-flop FF1 experiences once again a negative change. This resets FF1 such that a "0" and "1" appear on terminals 01 and 02 of FF1, respectively.

An "01" state is decoded by gate G181. Termination to the service line is allowed (if terminating FF is set) via lead GHA1, of FIG. 2A, transistor Q2, gate G13, lead TRM, and gates G203 and G192, of FIG. 2B.

The corresponding STA lead, i.e., STA1 to the display control is pulsed to "0" via gate G25. Since this is a unique situation, it allows identification of the service line in whose storage area data from the line encoder have to be placed. Note that all STA leads from other display equipped lines are at "1" due to an inhibit (0) put out by the gate G155 and STIN lead. At the same time, the FMI signal to the system allotter is removed via gates G191, G199 and G202.

Now the display system line is tested for successful termination. Consequently, 150 microsecond timer, M7 is activated. When M7 times out, the NOD lead from the display control circuit 54 is monitored. A "0" on it, is interpreted as a successful matrix firing. This "0" activates timer M1 via gate G9 and the SFF lead through gates G156 and G196. If the matrix had not fired, the NOD lead remains at "1" preventing a "1" on the SFF lead.

While timer M1 remains active, and during an active signal from the system bus, no action takes place because of an inhibit placed by gates G24, G9. Note that timer M3 holds itself active via a feedback from terminal 02 to input lead I1.

When finally the telephone system bus readout signal switches to its idle state, gate G8 switches to a "1" via gate G1 and transistor Q1.

This signal returns the interface control to its idle state. Consequently, the flip-flops FF1, FF2 and the terminating FF are reset via gates G188, G165, G206, HUT1 lead. A "0" on TRM lead removes the inhibit placed by gate G9 so timer M1 can now cover for the duration of the interim period between the matrix firing and operation of the RU relay of the display system line.

Since the inhibit signal via the STIN lead is removed, the STA1 lead to the display control circuit is marked over a path via gates G15, G19 and lead SFF and timer M1.

The terminating signal to the display line is removed via lead GHA1, transistor Q2, gate G13, and the TRM lead.

The FMM lead to the display control also switches to idle at this time. After the timer, M1 has timed out, the BLF1 lead of the line should go to +18V. This, in turn, will set the flip-flop comprised of gates G16/17 via G14, G5, G2 and timer, M1 (if not inhibited by an active signal on the LB lead, i.e., G3 at a "0" logic level).

When the called line equipped with the display unit finally answers, the LB1 lead of the SS line extends +18.5V. This extends a display activating signal to the display control circuit via RD1 lead, gates G20, G6, G3 and FF comprised of G16/17.

When the SS line hangs up, FF G16/17 is reset via G4, G3, G2 and this returns STA1 lead to "1" which in turn, clears stores in the display control circuit.

Where a display unit is to be installed at an attendant station, the straps indicated as B are closed and those indicated by the letter A (shown in FIG. 2A as closed) are opened. Closure of the B strap inhibits the 20 ms. timer M1 and deletes the ground from gates G21, G22, G23 enabling these gates for usage.

The telephone system bus readout signal, i.e., FM and the assigned H (usually "0") for the attendant call is detected by transistor Q1 and Gate G1. The signal is transmitted to the SS1 control via the HFM lead and gate G175 of FIG. 2B.

As a result, the STOR lead to display control circuit is pulsed via G200. A station inhibit signal is sent to all interface circuits via the STIN lead, and gates G204, G155. In addition, the FMM lead (FIG. 2B) is pulsed to "0" via gate G201.

The attendant control sends a signal to the attendant trunk to mark the matrix via the AM01 lead (for attendant trunk 1). The signal is monitored by the interface circuit of FIG. 2A and is gated to gate G8 by gate G22.

If the matrix path to the attendant trunk has fired, lead ATB1 is signalled over the B strap from lead BLF. A "1" on ATB1 is detected by the interface circuit of FIG. 2A. The signal removes inhibit on FF G16/17 via G21 and G4. In conjunction with AMO, the ATB1 signal sets the flip-flop comprised of gates G16/17 via G23, G10 and G8.

At the same time, the STA1 lead to DCC is pulsed to "0" in order to transfer data to the permanent store. This transfer is accomplished by gates G19, and G15. Note that all other STA leads are at "1" via a "0" on the STIN lead.

When the telephone system bus readout signal returns to idle, the interface control is reset via gate G1, HFM lead, G175, G169. The reset signal causes the FMM lead to the display control to return to idle. The STIN lead is switched to a "1" allowing all stations with their individual flip-flop comprised of gates G16/G17 to extend a permanent signal on the STA lead. In this particular case, the STA1 lead puts out a "0" via gate G19 and the flip flop of G16/17.

When the attendant enters the trunk, the A1T1 lead is signalled and is monitored by the interface circuit. When an active signal is detected, the active signal is extended to the display control to enable display via lead RD1, and gates G20, G6 and G16/17.

Should the attendant release from the trunk (AIT lead to "1"), the display would be disabled via gate G19. However, the storage would be maintained for as long as the ATB1 lead puts out a "1".

When the matrix to the attendant trunk is released, lead ATB1 switches to a "1". Consequently, the flip-flop of gates G16/17 is reset, causing the storage area in the display control to be cleared via the STA1 lead and gate G19.

Within the interface circuit, all other calls to a display equipped station are identical to the operation of the line call previously described, with the single exception being a call from the attendant to the interface circuit via an attendant trunk.

In conjunction with the readout signal from the telephone system bus which pulses the interface control via leads H1, T1, U1 and gate G206, the ATP lead (attendant's RIT pulse), causes several events to take place. The STOR signal to the display control is inhibited via gates G157, G158, and G200; the terminating flip-flop comprised of gates G197/G198 is set via G195, and the pulse generator comprised of flip-flops FF1 and FF2 is set by gates G188, G184 and G198; terminating time slot is simulated and timer M7 is started via G174, G175; FF1 and FF2 are inhibited via G173. The FMM signal to the display control without the corresponding STOR signal is interpreted as the "0" display type of call. During this call no FM1 or DBJ signals are generated. The terminating signal to display equipped line is extended without a delay.

Each interface circuit may be individually busied out by placing a busy out clip between the test points TP1, TP2. The busy out doesn't interfere with the normal operation of the display equipped station in calling in or out, but only disables the data storing direction of the interface circuit.

When the signal from the telephone system bus is detected, transistor Q1 is pulsed. The pulse signal in turn is extended via the busy out clip to the BO lead via gates G18, G11. The signal on the BO lead inhibits all storing functions via gates G151, G171, and G168. At the same time, termination of the call is enabled via gate G12.

The entire circuit may be busied out by placing a clip over the "circuit busy out" terminals in FIG. 2B. This condition prevents any signal coming over the HUT and HFM leads from being extended to the interface control circuit over gates G151, G171, G168. At the same time, the TRM lead is permanently enabled, allowing termination to the station line when the other conditions are met over gates G154 and G203.

When the power is turned on or the PCB containing the interface circuit is inserted into its operative position, the auto reset circuit acts in such a manner as to reset all flip-flops over gates G151, G171, G168.

Figure 3:
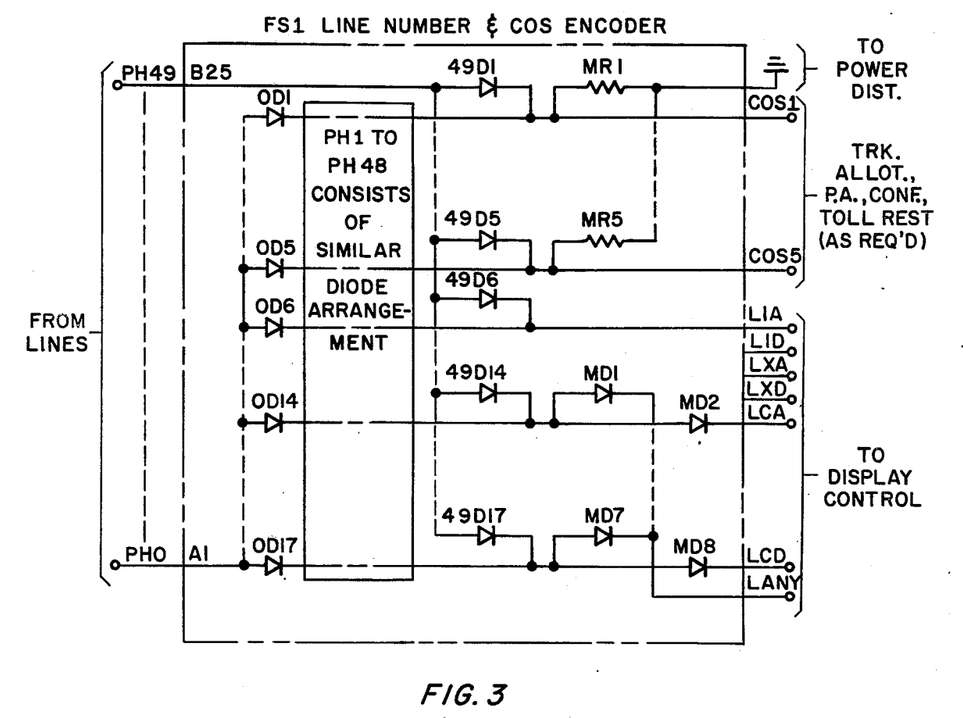
FIG. 3 is a schematic circuit diagram of the line number and class of service encoder of FIG. 1.

The encoder of FIG. 3 provides a simplified showing to provide five classes of service of leads COS-1 and four similar leads, COS-2, COS-3, COS-4 (not shown) and COS-5. The class of service circuit is a 100× 5 diode matrix per each 100 lines as is known in the art. When it is desired to restrict a line from one or more of the feature circuits, a diode is strapped between that line and the feature circuit on the diode matrix strapping field. One diode is required for each line to each feature circuit.

Coding of three digits (three leads per digit) with one lead only of each digit being shown — LIA, LXA, LCA and the check bit lead LANY. The line number circuit includes a diode matrix L × 12, where L may be any number of lines, up to 800 lines and on the 12 side appear up to four display control circuits (in parallel).

To encode the identification number of a line, diodes are strapped between that line and the 12 line number bus in a three-digit complemented BCD format. The quantity of diodes per line depends on the number encoded and varies from 3 to 12.

The LANY lead provides a further lead to provide an added one or zero bit for further number discrimination.

FIG. 3 shows an exemplary line number and class of service circuit. This circuit provides restriction (Class of Service or COS) on a per line basis, for access to feature circuits such as trunks, public address systems, and conference circuits as well as to tool restriction circuits. In addition, it provides for the assignment of an identification number for any line. Typically, the identificatin number may include 3 digit plus 1 bit for a line.

When it is desirable to restrict a line from making a call to a feature circuit, a class of service can be assigned to that line which will make it impossible to complete the restricted feature call.

The class of service circuit includes a diode matrix, 100 × 5, on each bay. On the 100-coordinate side appear the lines 00-99, and on the 5-coordinate side would normally appear the trunk allotter, conference, public address, toll restrictor, and one extra coordinate, generally used for an extra trunk allotter, i.e., if more than one trunk group is provided. The 5-coordinate side outlets can be strapped to any feature as desired.

When it is desired to restrict a line from one or more of the feature circuits, referred to above, a diode is strapped between that line and the feature circuit on the diode matrix strapping field. One diode is required for each line to each feature circuit.

The Line Number circuit consists of a diode matrix L × 12. On the L side appear up to 800 lines and on the 12 side appear up to 4 Display Control Circuits (in parallel).

To encode the identification number of a line, diodes are strapped between that line and the 12 Line Number bus in a 3 digit complemented BCD format. The number of diodes required per line depends on the number encoded (000–999) and varies from 3 (for 777) to 12 (for 000).

In Hotel or Motel applications where 4 digits are required, the LANY lead may be optionally strapped or left open (per PCB of 50 lines) to indicate one or zero as the thousands digit. Note the limitation that the 50 lines brought to a Line Number circuit can be assigned floors 1 through 9, or 10 through 19, but cannot be mixed.

When a featured digit is dialed by the extension, it is recognized by the register, which instructs the junctor to drop the call and terminate it to a feature circuit. At this point, the line's PH lead is positive (+18 volt). If a COS diode is present, the PH voltage is read through the COS diode and into the feature circuit. The feature either blocks the call by inhibiting its QH mark (PA, etc.) or remembers the information and monitors the call for subsequent actions (Toll Restrictor, Conference, etc.).

When a call is made to an attendant, the call proceeds as for a call to a feature except for the fact that the "feature" is an attendant's trunk.

During the COS check while the PH is positive, information is read from the Line Number Bus by the Display Control circuit. If a diode is present in the line number array, current will flow from the Line Circuit, through its PH, through the diode, through a wire of the Line Number bus and into the Display Control Circuit. The Display Control then makes this information available on a display at the called party's location.

In the event of a call to a line, the Display Control will force the System Allotter into a COS check sequence upon receipt of a signal from a Single Digit Access Circuit. The call will then proceed as in the last paragraph above.

If it is required to restrict a majority of lines to the various features, the system can be arranged such that an absence of the class of service diode provides the restriction. In this case, the feature circuits require a different strapping option. This method saves on the number of class of service diodes such that the number equipped will always be the minority number of lines, regardless of whether the minority is restricted or unrestricted.

The operation of the circuit of FIG. 3 is called in when a feature digit is dialed by the extension. The called number is recognized by the register, which instructs the junctor to drop the call and terminate it to a feature circuit. At this point, the line's line side appearance lead is positive (+18 volts). If a class of service (COS)diode is present, the line side voltage is read through the COS diode and into the feature circuit. The feature either blocks the call by inhibiting its supervisory side mark or remembers the information and monitors the call for subsequent actions such as toll restrictor, conference, etc.

On a call to an attendant, information is read from the line number bus by the display control circuit during the time that the line side is positive such as during COS check. If a diode is present in the line number array, current will flow from the line circuit, through its line side appearance, through the diode, through a wire of the line number bus and into the display control circuit. The display control then makes this information available on a display at the called party's location, as will be explained.

Figure 6:
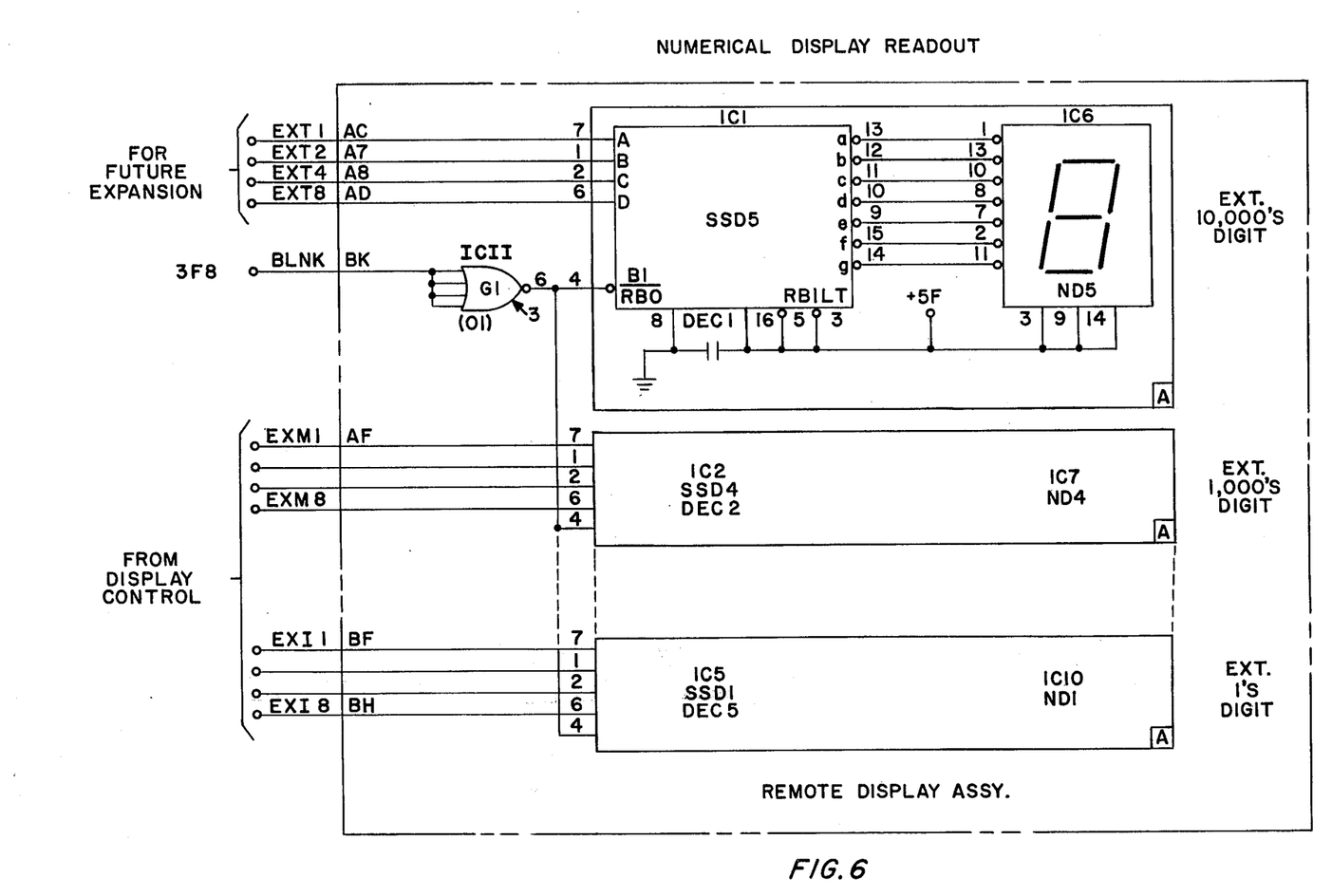
FIG. 6 is a schematic circuit diagram of a remote display in FIG. 1.

The Display Control Circuit of FIGS. 4A-4E stores the line number from the line number encoder (FIG. 3) in accordance with signals from the service station interface (FIGS. 2A, 2B) and provides signals to the display consoles (FIG. 6).

A preferred embodiment of the Display Control circuit includes features enabling it to provide time slots for ten display consoles; provide storage for twelve line numbers; serve up to four attendants or eight service stations, depending on strapping; provide an indication when no line number is present; and provide a busy-out signal to prevent further response to storage requests.

Figure 4:
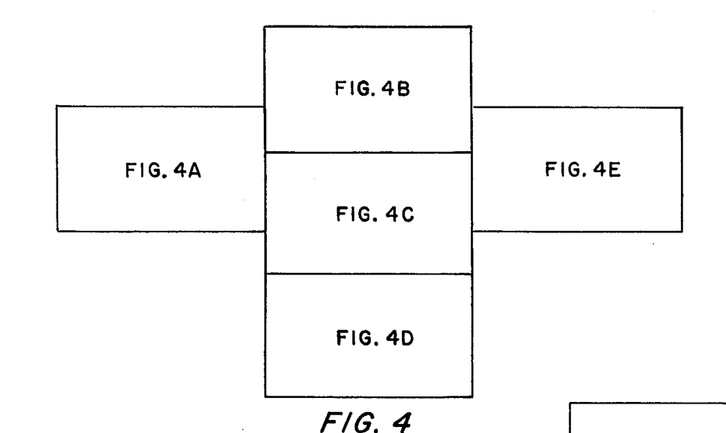
FIGS. 4, 4A to 4E are schematic circuit diagrams of the display control circuit of FIG. 1.

The Display Control Circuit exhibits a storage mode and a display mode. In the storage mode, during the termination slot of calls to service stations, the Service Station Intercept Circuit (SSI, FIGS. 2A, 2B) generates FMM and STOR. The SSI returns all STA leads to idle in preparation for service station identification, then generates a STOR pulse. When STOR is 0, the identity of the originating line — as developed by the Line Number Encoder (LNE, FIG. 5) — is stored in temporary latches by the display control circuit (DDC, FIG. 4). After the SSI has checked the desired service station for a non-busy condition, it grounds that station's STA lead. The DCC generates an address corresponding to the single STA lead which is at ground and writes the line number held in the temporary latches into the memory location specified at STA. At the end of FMM the DCC changes from Storage Mode to Display Mode.

In the display mode the Memory Address Register (CX1, FIG. 4A), steps slowly through states 0 to 9 enabling displays 1 to 10 in FIG. 6 and reads out memory to the display if permitted by the appropriate RD lead. If the appropriate STA lead is 1, indicating an idle on-hook condition, blanks are stored in that memory location. The CX1 steps quickly through states 11 and 12 (do nothing) and 13 to 15. During states 13 to 15 the attendant's trunks with RD idle are cleared depending on their appropriate STA leads.

Condition of the logic gates in FIGS. 4A-4E may be determined by the presence or absence of a circle on the output side. A circle on the output of a logic gate indicates that the active condition is "0" or ground and that the idle condition is a "1" or +5 volts at the output of the gate. No circle on the output of a logic gate indicates that the active condition is "1" or +5 volts and that the idle condition is a "0" or ground at the output of the gate. In the idle state, transistor Q41 is "ON" and transistor Q42 is "OFF".

DETAILED DESCRIPTION OF THE DISPLAY CONTROL CIRCUIT

In the storage mode, an extension of a call to a Service Station utilizes the leading edge of the signal on the FMM lead. It will be recalled that during the termination slot of the call, SS1 (FIGS. 2A, 2B) generates signals over leads FMM and STOR. The signal over FMM inhibits further clearing of memory for on-hook stations via FMM, G414, G426(0) and disabling gate G425. For the duration of FMM, refreshing of the displays is inhibited via G486 (DMODE+ = 0) disabling SEND+ via G439 and G442. STOR at 0 enables the temporary line number latches SR1, SR2, SR3 (FIG. 4D) via G437 (ENAB+ = 1). At this time the SSI disables all STA outputs.

Figure 5:
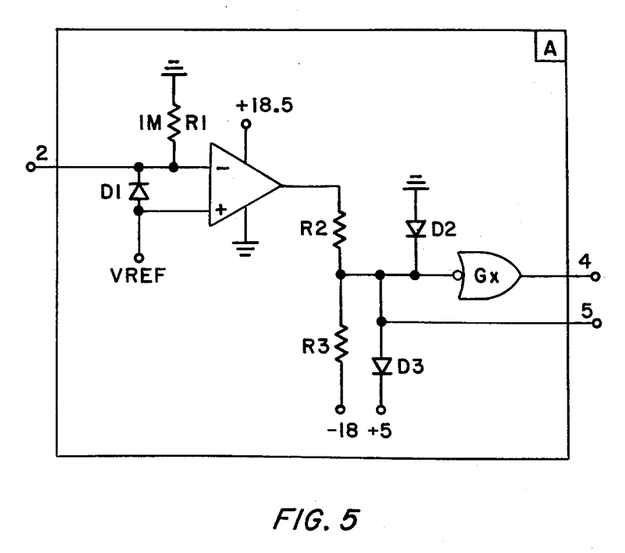
FIGS. 5 and 5A are schematic circuit diagrams of a coder translator.
Figure 5A:
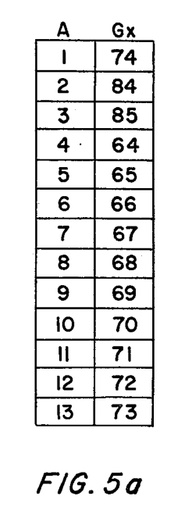

The System Allotter proceeds through the feature call sequence during which the Class-of-Service (COS) check occurs. This loads the line number of the extension from the LNE (line number encoder) boards into SR1, SR2, SR3 and G474 via terminals 2, 4 and 5 of FIG. 5, shown as display controls A1 to A13 in FIG. 4D. The +18V on the extension's PH is extended to the L(I, X, C) (A, B, C, D) and LANY leads depending on diodes equipped on LNE.

For example, if the LANY lead is strapped for the LNE board to which the extension PH is attached, LANY will go to +18V sending A13's (See FIG. 5 for A13 and G73) output from +15V to +3V and G473 from 0 to 1 which sets the B bit in SR3. If any of the L leads is at +18V, the No Output Detected (NOD) signal is removed via G494 (IDENT + =1), G495, G496 (NOD=1).

Since the 1's complement of the line number was encoded on the LNE, the output of SR1-3 must be recomplemented before loading into memory. In the case when the extension is on the tenth floor (LANY, LCD, LCC, LCB and LCA = 18V), hundreds digit is converted from 1111 to 0000 via G460, G461, G462, G463.

After the COS check the SSI returns STOR to 1 which disables SR!, SR2, SR3 via G437(0) to save the stored line number. After the SSI has checked the desired station for a non-busy conditon, it grounds that station's STA lead.

For example, if the call was to be the service station connected to STA4, the SSI would disable STA1-3 and STA5-12 at 1 and ground STA4. Two T1+ times after receipt of FMM and DCC begins scanning for this single STA lead. CX1 is incremented every T1+ since FF42 is reset by G411 with G486 (DMODE+ =0). When the grounded STA lead is addressed, writing is enabled at G424 via DS10(0), G413 (STAX− = 1).

Between successive T1+'s when the address is stable, T2+ is generated which writes, if G424 is enabled, via (WRIT+ = pulse to 0). If the service station had been busy, none of the STA wires would be at ground and G424 would always be disabled.

When FMM goes away FM+ returns to 0 representing the display mode which disables further writing via G424. After two T1+ times to allow the STA leads to return to normal, writing is enable into RAM1-4 via G426 with FF 45 enabling G425. The temporary stores SR1-3 are now cleared via G428 (TMPRST− = 0).

Calls from an extension to an attendant proceed in the same fashion as a call from an extension to a service station (described above) insofar as the Display Control is concerned.

In a call from an attendant to an extension or in-coming trunk calls connected via attendant or camp-on-busy the initial part of the procedure is like the foregoing. However, during the COS time slot, the DJ has no effect on the attendant's. trunk so the L leads remain idle and SR1, SR2, SR3 remain cleared. Since A1-A13 remained at 1; SR1, 2, 3 are unchanged. This is complemented by G452, G463 to generate a blank for hundreds, tens and units. Thus, the Line Number stored will be Obbb (where b represents a blank or X'F').

Figure 4A:
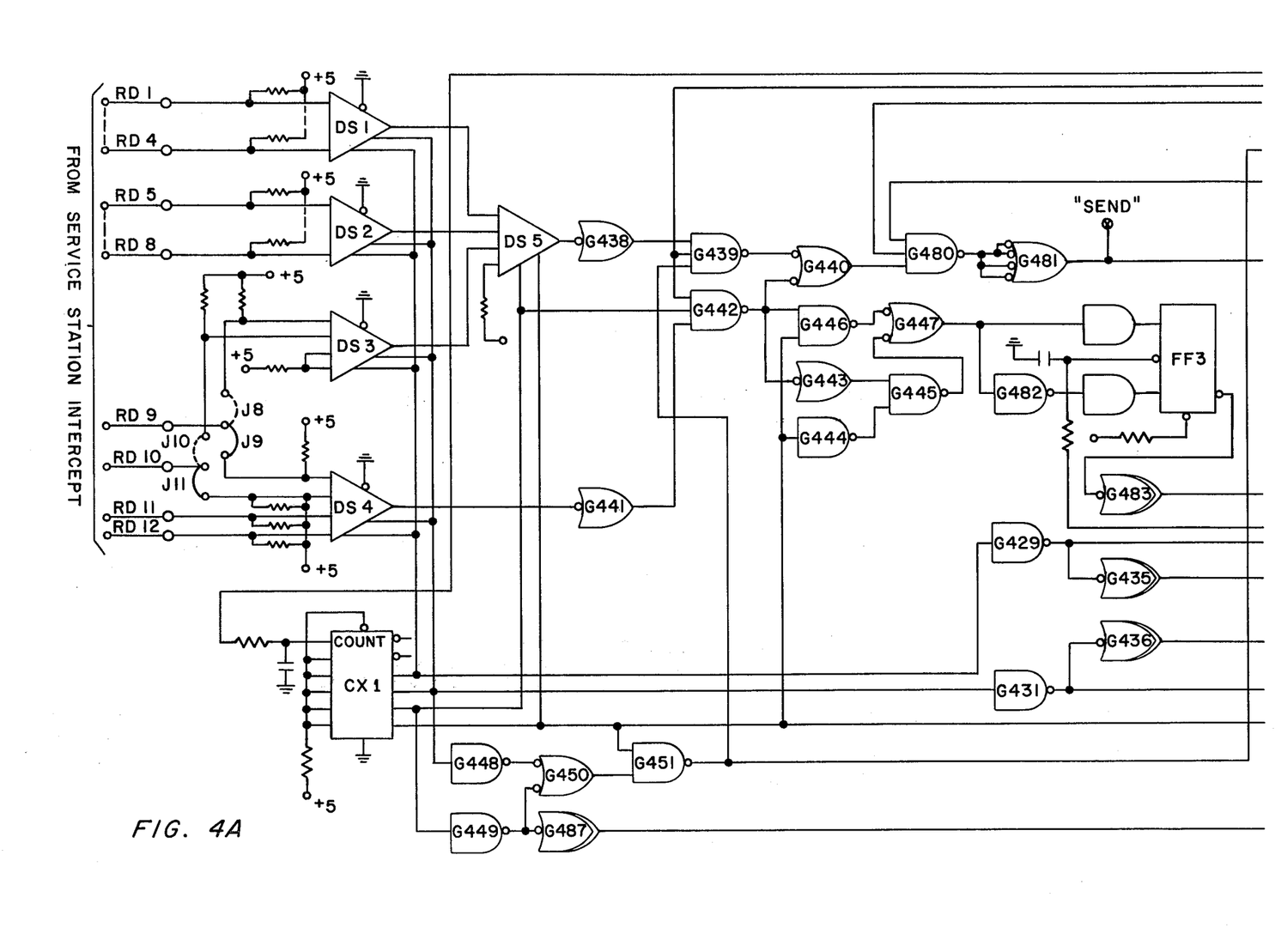
Figure 4B:
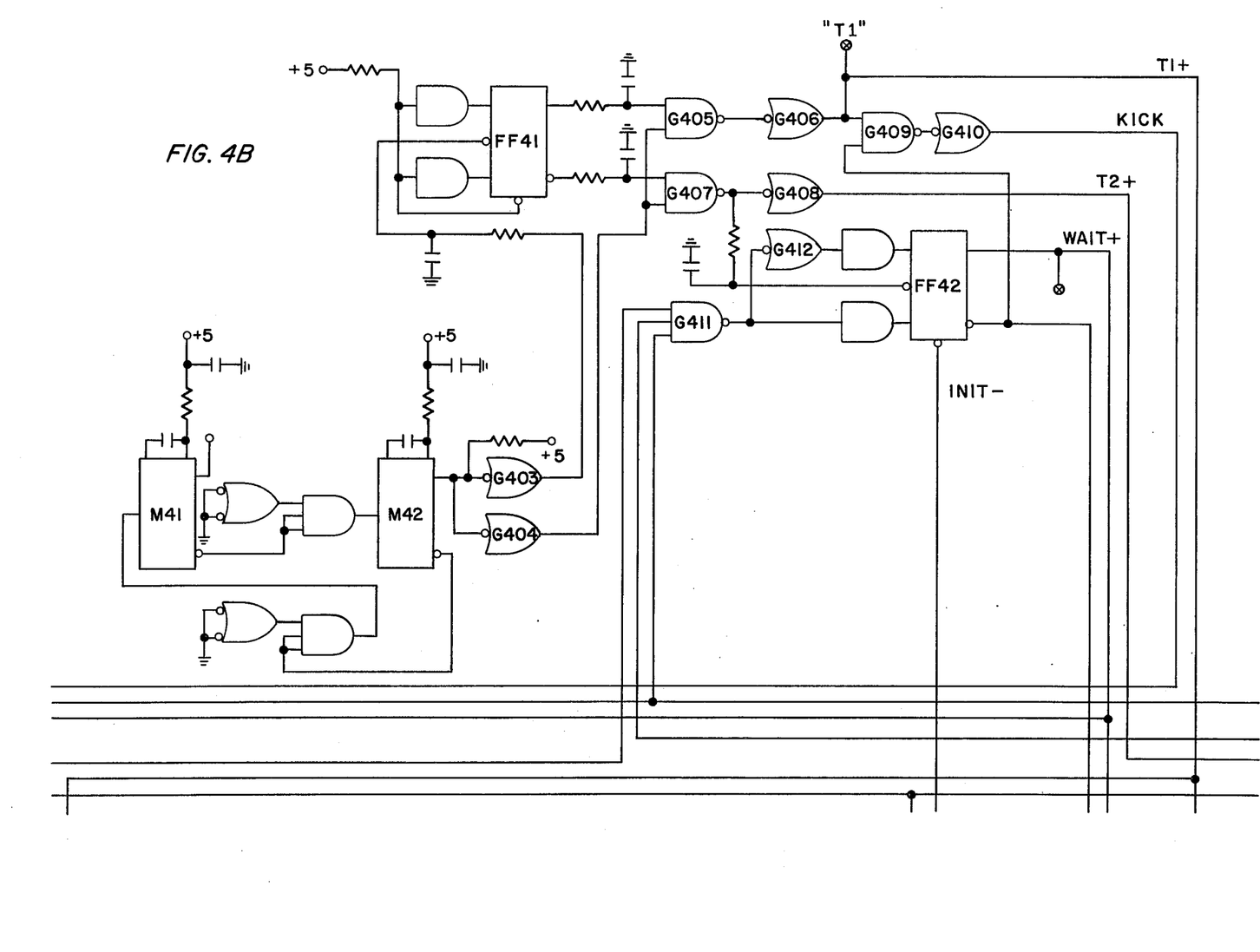
Figure 4C:
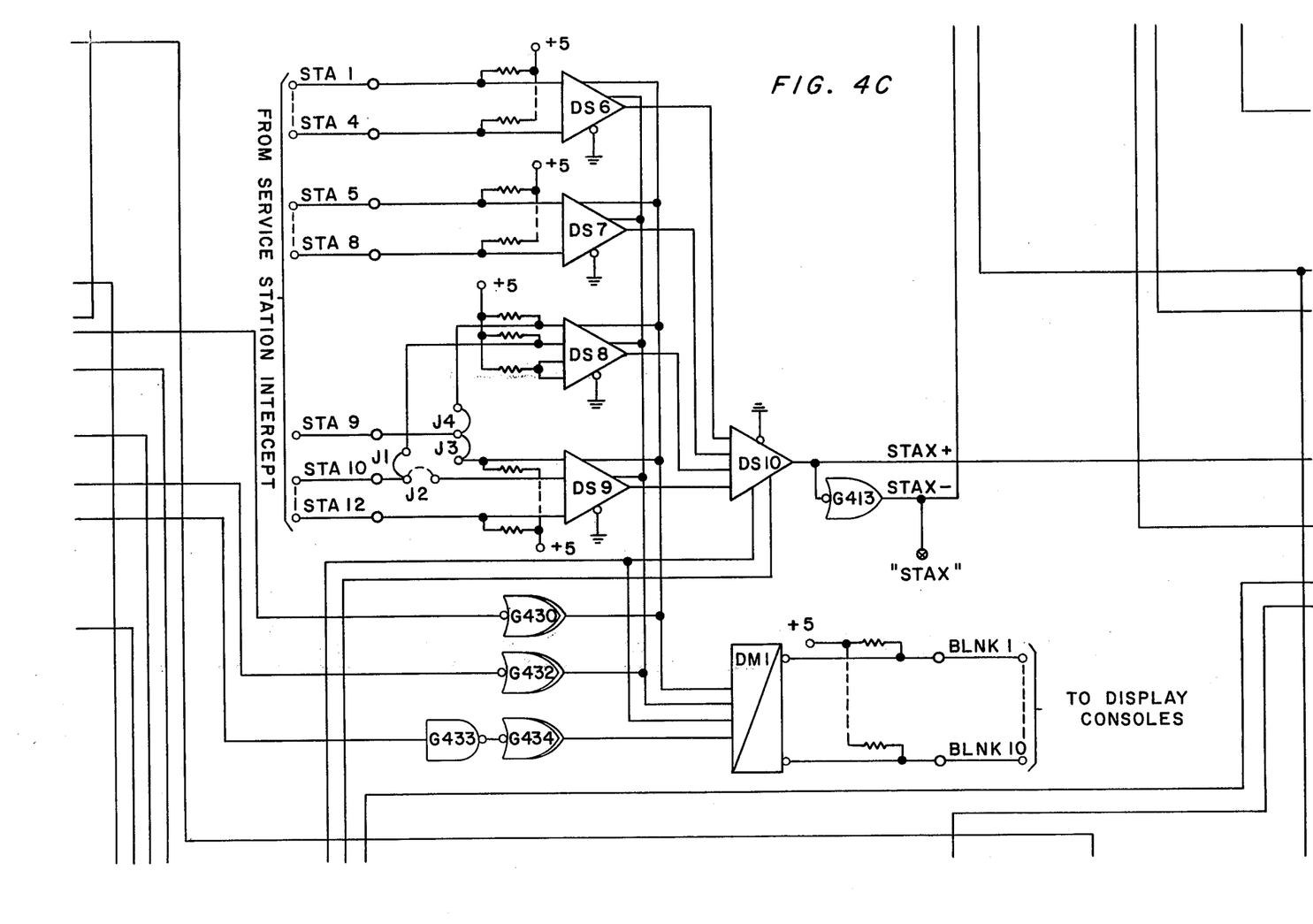
Figure 4D:
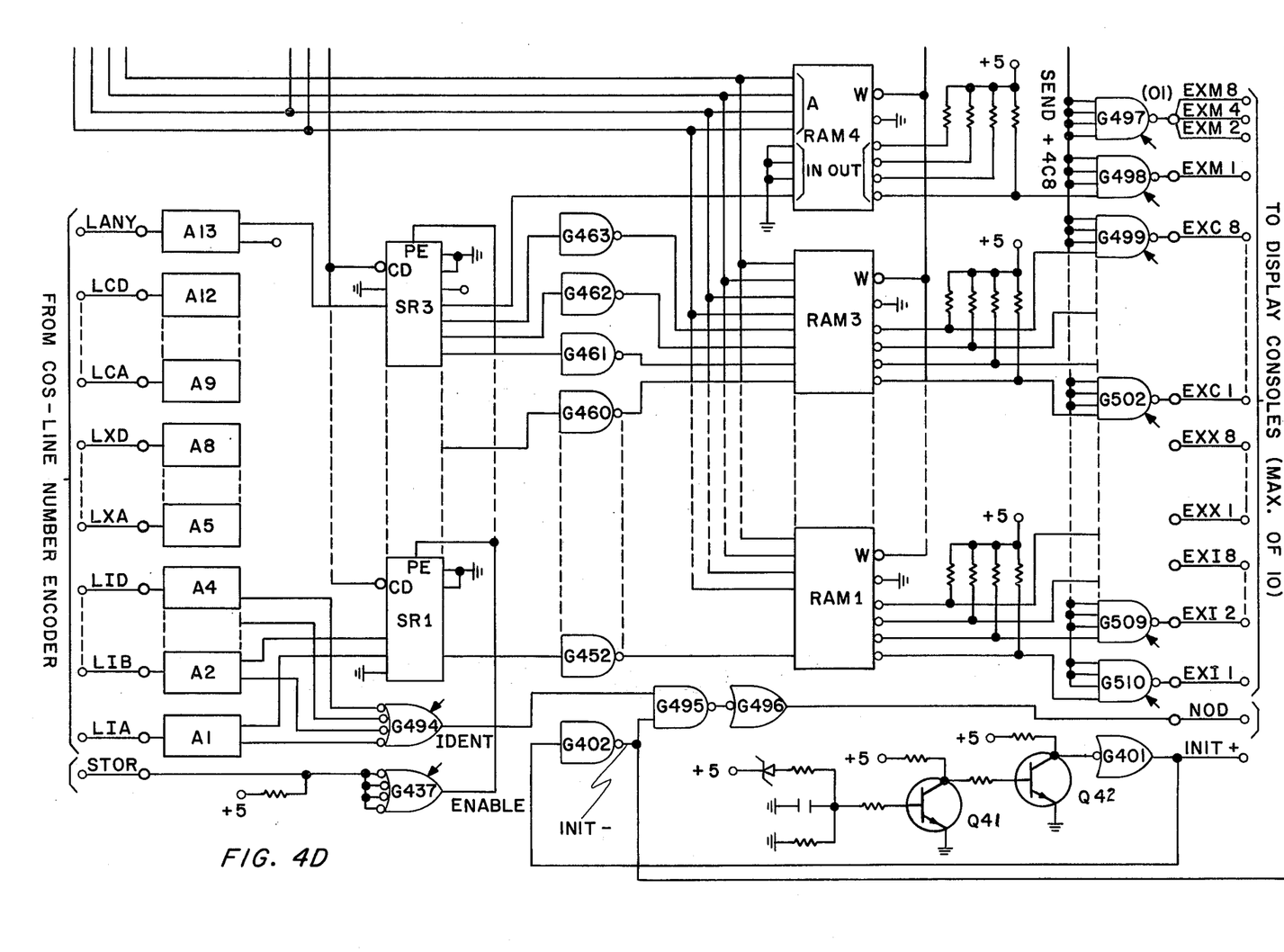
Figure 4E:
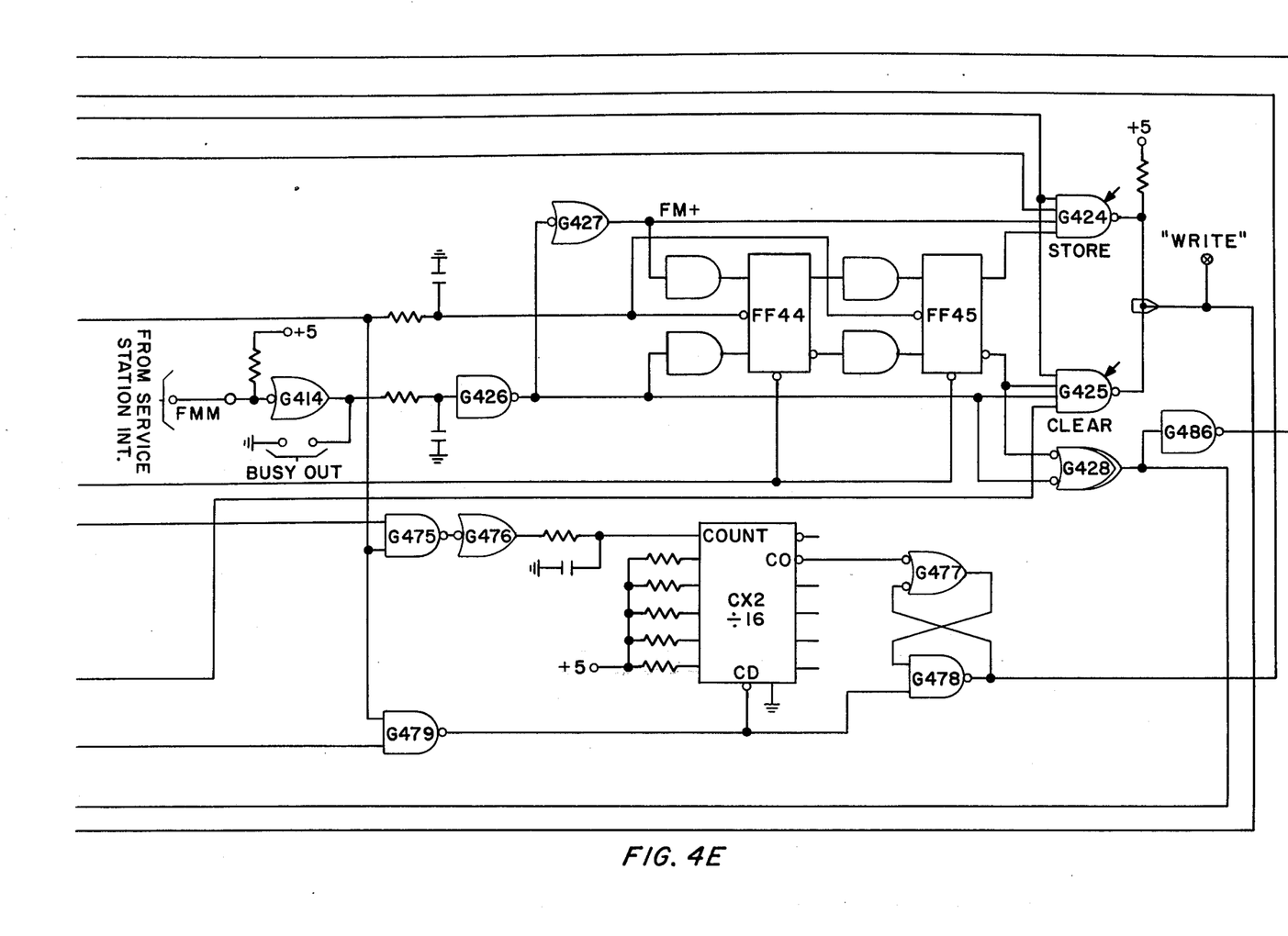

The Display Control Circuit in its display mode may be arranged for service station scanning by having CX1 initially set to contain X' F', FF42 reset, and M41 ad FF41 in condition such that T1+ occurs.

Phase 1(T1+) of the two-phase clock M41, FF41) going to 1 is enabled via FF42(0) to increment CX1 via G409, G410 (KICK + = going to 1). After CX1 has stabilized at 0, the output of DS5 takes on the value of RD1. If service station 1 has received a call and is off-hook, then both STA1 and RD1 are at ground.

To prevent the memory address from changing, FF43 is loaded with ADX+ when Phase 1 (T2+) returns to 0. (For counter states involving RD5-8 see the paragraphs above relating to attendant trunk scanning). DM1 decodes CX1 and grounds only BLNK1 to enable only station 1's display. The address is sent to RAM1-4 which reads out the complement of the contents of Location 0.

Later, when FF42 is set to WAIT += 1, buffers G497, G498, . . . G510, will be enabled via G438 (RDAX += 1) (since service station 1 is off-hook), G439(0), G440(1), with G413 (STAX− =1) (since service station 1 received a call) to G480 (0) and amplified via G481 (SEND +=1). SEND + is enabled only when WAIT +=1 to avoid placing erroneous information on the EX bus. The buffers again complement the line number so "true" data is sent to the displays via EX (I, X, C, M) (1, 3, 4, 8).

During Phase 2 (T2 +) a delay timer CX2 is enabled and clearance of the memory is permitted. G478 (DELY− =1) with CX1 state 0 through 9 (G451 (DISP+ =1)) provides a 1 to be loaded into FF42 (WAIT +) during Phase 2 (G407 at 0). If the station was idle (or was making an outgoing call), its STA lead at 1 would enable Obbb (b represents blank) to be loaded into its memory location during time T2 via DS10 (STAX+ =1), G424, (WRIT− =0).

During further Phase 1 times, CX2 is decremented via FF42 set (WAIT+ =1), G475 and G476 while CX1 is inhibited via FF42 (WAIT− =0) at G409. When CX2 reaches 0 during T1 it sets G477/G478 (DELY− =0). This will enable FF42 to be cleared in T2 so that CX1 can be incremented to 2 in the next T1 (see timing in FIG. 3).

This cycle occurs for states 0 through 9 which apply to service stations and attendant's trunks. For states 10 through 15, FF42 is loaded with 0 (No waiting) via G488(0) or G449(0), G450(1) with ADX+ forcing G451 (DISP+ =0). The counter cycles quickly through these states which are used to clear locations dedicated to attendant trunks.

For attendant trunk scanning assume strapping such that CX1 contains X'3', FF42 is reset and M41 and FF41 are such that T1+ occurs.

Phase 1(T1+) going high increments CX1 to state 4. After CX1 has stabilized, the output of DS5 takes on the value of RD5 and DS4 the value of RD9. IF attendant 4'2 second trunk is to be displayed, RD9 is grounded so G441 (RDBX+ =1), G442, and G440, enable G480 and G481. G481 provides a send signal gate G497, G498, . . . G510 to enable readout of memories RAM1-RAM4 over appropriate lines EXI1, . . . EX18, EXC1, . . . EXC8, EXM1, . . . EXM8 to the display assembly of FIG. 6. Also G442 (0) causes bit ADX+ to be flipped from 0 to 1 which will be stored in FF43 at the end of Phase 1. Although CX1 contains 4, memory location 12 is referenced.

Thus, states 4 to 7 of CX1 enable memory locations 4 to 7 if RD5 to RD8 are low unless RD 9 to RD12 are low (with option 3) under which case memory locations 12 to 15 are used.

During CX1 states 12 to 15, DS4 via G441 (RDBX+) is permitted once again to flip bit ADX+. During this time when all displays are disabled (BLNK1 to 10 are 1), the corresponding memory location which WAS NOT displayed during CX1 states 4 to 7 is addressed via A (A, B, C, D)+ and cleared if its STA lead is 1. For example, if RD12 is 0 then when CX1 contains 7, DS4 will connect RD12 to G441 and RDBX + high will flip ADX+ to access memory location 15. This causes location 15 (ATTD 1 Trunk 2) to be displayed. During non-display time, when CX1 contains 15, DS4 again connects RD12 to G441 so that ADX+ is flipped to the access memory location 7. This permits location 7 (ATTD 1 Trunk 1) to be cleared if STA 8 is high.

The AC+ input to G442 prevents ADX+ from being flipped during service station display CX1 states O to 3, 8 and 9.

The circuit can be prevented from loading line numbers into memory during future FMM times by grounding the input to G426.

Automatic reset of the circuits is possible, since, when the PCB is plugged in, Q41, Q42 generate a pulse to ground (G401 goes high). G402 (INIT− = pulse to 0) prevents generation of spurious NOD signals while the circuit is powering-up by inhibiting G495 and disables the EX bus by resetting FF42 to WAIT+ =0.

While the principles of the invention have been described above in connection with specific apparatus and applications, it is to be understood that this description is made only by way of example and not as a limitation on the scope of the invention.

We claim:

1. A system for displaying the identification number of a calling line comprising, display means, encoder means for providing signals identifying a calling line, display control means coupled to said encoder means including means to store said signals, interface means sensing lines of said system, for a call directed to a called line identified with the display means, said interface means including means for temporarily intercepting said call for a timed period to enable completion of identification of the calling line by said encoder means, means operative at the end of said period to complete the call to the called line, and said interface means including control circuits responsive to passage of said time period to enable to display control means to supply control signals to the display means identified by the signals in the means to store.

2. The system as claimed in claim 1, in which there is a switching network at which calling and called ones of the lines of said system have individual appearances, and in which the encoder means includes a diode matrix coupled between appearances of lines to be identified and the display control means.

3. The system as claimed in claim 1, in which the means to store includes an electronic memory and said electronic memory determines a specific display of the display means to be operated in response to a command from the interface means.

4. The system as claimed in claim 2, in which the interface means is coupled to a line having an appearance on said network for completion of said intercepted call thereover, whereby the interface means is enabled to sense completion of a call to a line associated with the display means.

5. The system as claimed in claim 1, in which there is a switching network for completing calls through the network, said network including as inputs appearances for the lines of said system and in which the encoder means includes a diode matrix, the means to store includes an electronic memory and the diode matrix is coupled from appearances of lines to be identified into the display control means and to the electronic memory.

6. The system as claimed in claim 2, in which the means to store includes an electronic memory and said electronic memory determines a specific display of the display means to be operated in response to a command from the interface means.

7. The system as claimed in claim 2, in which the interface means is coupled to a line associated with display means whereby the interface means is enabled to sense completion of a call to said line associated with the display means.

8. The system as claimed in claim 2, in which the means to store includes an electronic memory and the diode matrix is coupled between said appearances of the lines into the display control means and to the electronic memory.

9. A telecommunications system for enabling the display of the identifying number of a calling line, comprising means for scanning for a called line at one voltage, means responsive to the preparation of completion of a call from a calling line to a called line for temporarily disrupting the prepared call to enable identification of the calling line at said line scan voltage for a predetermined time period, means operable during said time period to provide signals representing the identification number of the calling party, and means to apply said identification number to a selected display at the end of said time period, and means for completing the call at the end of said period.

10. A system for displaying the identification number of a calling line, comprising means responsive to sensing of a call directed to a station equipped with a visual display, means for receiving signals representing the identification number of the calling line, means for storing the signals representing the identification number for a selected time period, display means coupled to receive said signals after the selected time period and provide a visual display of said identification number, and means operative at the end of the timed period for completing the call from the calling line to the called line.

11. The system as claimed in claim 10, in which the means to store includes an electronic memory and said electronic memory determines a specific display of the display means to be operated in response to a command.

* * * * *